Feb. 8, 1944.  C. PAULSON  2,341,412

ELECTROMAGNETIC RESETTING APPARATUS

Filed Nov. 27, 1941

INVENTOR
C. PAULSON
BY Harry C. Duft
ATTORNEY

Patented Feb. 8, 1944

2,341,412

UNITED STATES PATENT OFFICE 2,341,412

ELECTROMAGNETIC RESETTING APPARATUS

Christian Paulson, Elmhurst, Ill., assignor to Western Electric Company, Incorporated, New York, N. Y., a corporation of New York Application November 27, 1941, Serial No. 420,695

4 Claims. (Cl. 200—110)

This invention relates to electromagnetic resetting apparatus and more particularly to a restoring device for meter type relays which is electromagnetically actuated.

It is an object of the present invention to provide a simple, efficient and inexpensive apparatus for electromagnetically restoring mechanism to a predetermined condition.

In accordance with one embodiment of the invention as applied to a meter type relay, the relay having the usual moving coil system for actuating a contact making pointer is equipped with a pointer in the form of a permanent magnet magnetized to have its extending or free end of a predetermined polarity. Mounted for cooperation with the permanently magnetized portion of the pointer are a pair of contacts with which the free end of the pointer is adapted to contact and, by the magnetic flux of the permanent magnet on the pointer, to maintain a good electrical contact therewith. A U-shaped yoke, having a central core member extending from the base of the U and made from soft magnetic iron or similiar magnetic material, is positioned with the arms of the yoke adjacent the pointer in its extremes of movement so that the magnetic flux of the pointer will, when the pointer is moved adjacent one of the arms of the yoke, cause the pointer to be attracted toward that arm to make an electrical contact between the end of the pointer and the contacts associated therewith. The central arm of the yoke has a coil wound on it in such fashion that when a current is passed through the coil, the yoke will be magnetized and will have a polarity at its central portion opposite to that of the adjacent portion of the permanent magnet on the pointer and will have a polarity at each of its outer arms, which is the same as the adjacent end of the permanent magnet pointer, thereby to repel the pointer from the outer arms to which it has been attracted and move it to position over the center core member, thereby to restore the meter to its normal position after the moving coil of the meter has effected a circuit closure between one of the contacts and the pointer.

Figure 1:
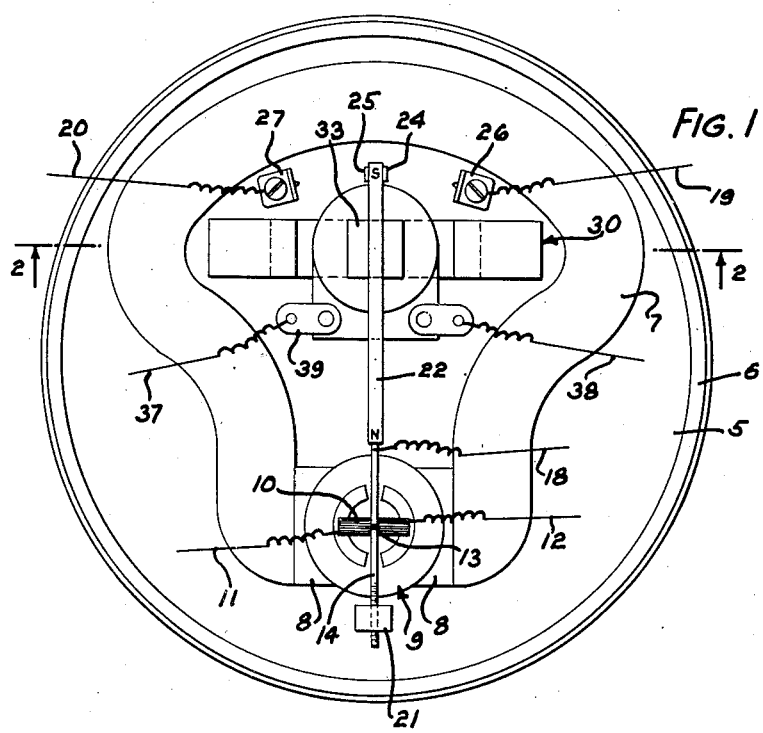
Figure 2:
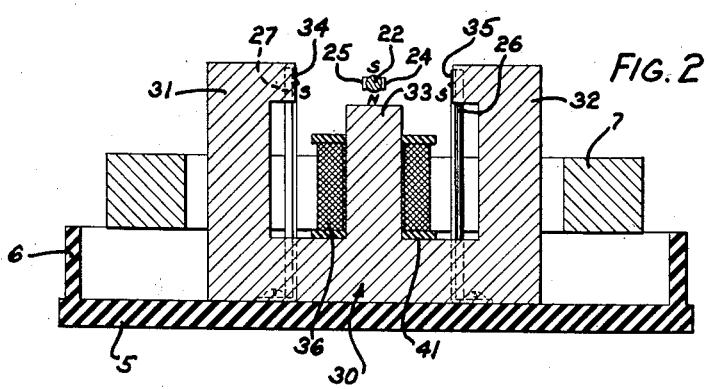

A better understanding of the invention will be had by reference to the accompanying drawing, wherein Fig. 1 is a plan view, with the cover removed, of a meter type relay embodying the features of the present invention and Fig. 2 is a vertical sectional view through the structure shown in Fig. 1 in the direction of the arrows.

Referring to the drawing, wherein like reference characters are used to designate similar parts in the various figures, particular reference being had at this time to Fig. 1, there is provided a meter base 5 of insulating material, on which the various parts of the meter are suitably mounted. The base 5 is provided with a circumferentially extending shoulder 6, to which a cover may readily be attached. Within the base 5, there is mounted a horseshoe type magnet 7, having pole pieces 8—8 between which a meter movement, designated generally by the numeral 9, may be positioned. The meter movement 9 includes a moving coil 10, which may be connected to a source of current to be measured by lead wires 11 and 12. The moving coil 10 is pivotally supported at 13 in any suitable manner and has fixed to it a pointer 14. Suitably connected to the pointer 14 is a lead wire 18, which may be connected in any electrical circuit including lead wires 19 and 20. The pointer has the usual balance weight 21 mounted on its shorter end and carries at its forward or free end a rod of permanent magnet material 22, having a definite polarity; for example, the end of the rod 22 adjacent the meter movement may constitute the north pole, whereas the free end of the rod 22 may constitute the south pole of the permanent magnet. At the end of the permanent magnet away from the meter movement, contacts 24 and 25 may be mounted on the rod 22 for engagement with fixed contacts 26 and 27, respectively, upon operation of the meter under the influence of the moving coil 10.

Adjacent the free end of the rod 22 and suitably supported in the base 5 is a yoke of magnetic material, designated generally by the numeral 30. This yoke of magnetic material is provided with upwardly extending arms 31 and 32 and a centrally positioned core member 33. The arms 31 and 32 have pole pieces 34 and 35 formed thereon which extend above the top of the core 33 and are in the path of movement of the pointer and its attached permanent magnet rod 22. Surrounding the core 33 is a suitable coil 36, so wound that, when a current is passed through it, it will set up an electromagnetic field in the yoke wherein the core 33 will have a polarity opposite to that of the adjacent end of the rod 22 and the pole faces 34 and 35 will have the same polarity as the adjacent end of the rod 22. This coil 36 may be supplied with energizing current through leads 37 and 38, suitable terminal members 39 and 40 being provided and the coil being suitably mounted on a spool 41 to which the terminals 39 and 40 may be attached.

In the drawing, the pole pieces have been designated with the symbols N and S to indicate the polarity of them when the electromagnet comprised of the coil 36 and yoke 30 are energized. In the operation of the apparatus, the electromagnetic circuit will normally be open and the leads 11 and 12 would be connected to a source of e. m. f., a quality of which is to be measured by the instrument and when so connected, the moving coil 10 will be influenced to rotate about its pivot 13 either clockwise or counter-clockwise, as viewed in Fig. 1. After the coil has been moved a predetermined amount, its associated pointer will move to a point where the magnetic rod 22 will carry its flux field into close enough association with the pole face 34 or pole face 35 as to polarize the pole face so that the rod will be attracted toward the pole face, thereby to make a positive connection between either the contacts 24 and 26 or the contacts 25 and 27. If the circuit to the moving coil 10 is then broken, the circuit between the closed contacts will be maintained until the coil 36 is energized and when the coil 36 is energized, the pole face 34 or 35 closest to the rod will reverse polarity and the core member 33 will be polarized oppositely to the adjacent end of the rod 22. In this manner, the pole faces 34 and 35, having the same polarity as the adjacent end of the rod 22, will repel the rod, whereas the core member, having a polarity opposite to the free end of the rod 22, will tend to attract the rod 22, thereby to restore the instrument to normal position. When the instrument is restored to normal, the rod 22 will be moved sufficiently far away from the pole faces 34 and 35 so that its magnetic field will not serve to attract it to the pole faces 34 and 35 and the instrument will be in condition to perform another measuring operation.

Although a specific embodiment of the invention has been described hereinbefore, it will be understood that modifications thereto may be made without departing from the scope of the invention, which is to be limited only by the appended claims.

What is claimed is:

1. In an electrical instrument, a moving coil system having a permanently magnetized pointer, a yoke of magnetic material having oppositely positioned pole faces adjacent the free end of the permanently magnetized pointer, said pointer being positioned for movement between said pole faces, said yoke having a central arm, and an energizing coil positioned on said central arm to polarize the pole faces of the yoke similarly to the adjacent portion of the permanently magnetized pointer.

2. In an electrical instrument, a moving coil system including a pointer, a permanently magnetized member fixed to said pointer, a yoke of magnetic material having its poles adjacent and oppositely positioned to the path of movement of the permanently magnetized member on the pointer, said poles being magnetized with a polarity opposite to that of the permanent magnet on the pointer when the permanent magnet's magnetic field is moved close to the poles, and a coil mounted to influence said yoke and wound to reverse the polarity of the pole pieces for repelling the permanently magnetized member on the pointer, thereby to restore the pointer to a normal position.

3. In an electrical instrument, a moving coil system having a permanently magnetized pointer, contacts actuated by said pointer, a yoke of magnetic material having oppositely positioned pole faces adjacent to the free end of the permanently magnetized pointer, said pointer being positioned for movement between said pole faces, contacts positioned adjacent to the pole faces of the yoke for engagement by the contacts actuated by the pointer to effect circuit closures, said yoke having a central arm, and an energizing coil positioned on said central arm to polarize the pole faces of the yoke similarly to the adjacent portion of the permanently magnetized pointer for opening a circuit between a contact actuated by the pointer and a contact adjacent a pole face of the yoke.

4. In an electrical instrument, a moving coil system including a pointer, a permanently magnetized member fixed to said pointer, contacts mounted on said member, a yoke of magnetic material having its poles adjacent and oppositely positioned to the path of movement of the permanently magnetized member on the pointer, said poles being magnetized with a polarity opposite to that of the permanently magnetized member on the pointer when the permanently magnetized member's magnetic field is moved close to the poles, a second pair of contacts positioned adjacent to the poles of the yoke for engagement by the contacts on the permanently magnetized member, and a coil mounted to influence said yoke and wound to reverse the polarity of the pole pieces for repelling the permanently magnetized member on the pointer, thereby to restore the pointer to a normal position to disengage the contacts on the pointer from the contacts adjacent to the poles of the yoke.

CHRISTIAN PAULSON.